(12) United States Patent
Pines et al.

(10) Patent No.: US 6,901,116 B1
(45) Date of Patent: May 31, 2005

(54) METHOD AND SYSTEM FOR REDUCING FALSE DETECTIONS OF ACCESS SIGNALS

(75) Inventors: Howard S. Pines, El Cerrito, CA (US); Ian Sayers, Redwood City, CA (US); Xiaode Xu, Fremont, CA (US); Wenfeng Huang, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 801 days.

(21) Appl. No.: 09/824,993

(22) Filed: Apr. 2, 2001

(51) Int. Cl.[7] .............................. H03D 1/00; H04Q 7/20
(52) U.S. Cl. ...................................... 375/340; 455/455
(58) Field of Search ................................ 375/227, 260, 375/216, 316, 340, 343, 346; 370/345, 347, 442, 206, 340, 343; 455/67.1, 436, 440, 455, 456.1, 422, 517; 714/709

(56) References Cited

U.S. PATENT DOCUMENTS

| | | | |
|---|---|---|---|
| 5,289,391 A | * | 2/1994 | Ibrahim et al. ............... 702/74 |
| 5,402,450 A | | 3/1995 | Lennen |
| 5,473,612 A | * | 12/1995 | Dehner et al. ............... 370/514 |
| 5,475,710 A | * | 12/1995 | Ishizu et al. ................. 375/232 |
| 5,553,081 A | * | 9/1996 | Downey et al. ............ 714/709 |
| 5,577,056 A | | 11/1996 | Malik et al. |
| 5,909,436 A | * | 6/1999 | Engstrom et al. ........... 370/343 |
| 6,088,593 A | * | 7/2000 | Dent ....................... 455/456.1 |
| 6,349,120 B1 | * | 2/2002 | Shi et al. ..................... 375/316 |
| 6,400,758 B1 | * | 6/2002 | Goldston et al. ........... 375/216 |
| 6,549,544 B1 | * | 4/2003 | Kroeger et al. ............. 370/482 |

OTHER PUBLICATIONS

Zhen–Liang Shi et al., A Sub–Burst DFT Scheme for CW Burst Detection in Mobile Satellite Communication, Sep. 2003, IEEE Transactions on Wireless Communications, vol.: 2, Issue 5, page(s) 953–963.*

Wern–Ho Sheen et al., Burst Synchronization of Slotted Random Access With Preamble Power Ramping in the Reverse Link of CDMA Systems, Mar. 2000, IEEE Journal on Selected Areas in Communications, vol.: 18, Issue 3, page(s) 380–390.*

* cited by examiner

Primary Examiner—Stephen Chin
Assistant Examiner—Lawrence B. Williams
(74) Attorney, Agent, or Firm—Baker Botts L.L.P.

(57) ABSTRACT

A demodulator determines a time of arrival of an access signal. Access signals that do not result in a time of arrival are discarded. Upon obtaining a time of arrival, the access signal is equalized and a training sequence of bits in the equalized access signal is compared to a reference sequence of bits. A burst confidence metric is obtained in the comparison by summing the number of matching bits. The access signal is discarded if the burst confidence metric is less than a threshold number. A decoder performs a parity check on access signals that have a burst confidence metric exceeding the threshold number. The access signal is discarded if the parity check fails. Upon passing the parity check, the access signal is re-encoded and compared to its received version. If a number of errors from the comparison exceeds a bit error threshold, the access signal is discarded.

26 Claims, 2 Drawing Sheets

| REFERENCE SEQUENCE | RECEIVE SEQUENCE | SIGN | METRIC |
|---|---|---|---|
| 1 ↑ | 1 ↑ | +1 | 1 |
| 2 ↑ | 2 ↑ | +1 | 2 |
| 3 ↑ | 3 ↑ | +1 | 3 |
| 4 ↑ | 4 ↓ | −1 | 3 |
| 5 ↓ | 5 ↓ | +1 | 4 |
| 6 ↑ | 6 ↑ | +1 | 5 |
| 7 ↑ | 7 ↑ | +1 | 6 |
| 8 ↓ | 8 ↓ | +1 | 7 |
| 9 ↓ | 9 ↓ | +1 | 8 |
| 10 ↑ | 10 ↑ | +1 | 9 |
| 11 ↓ | 11 ↓ | +1 | 10 |
| 12 ↑ | 12 ↑ | +1 | 11 |
| 13 ↓ | 13 ↓ | −1 | 11 |
| 14 ↑ | 14 ↑ | +1 | 12 |
| 15 ↓ | 15 ↓ | +1 | 13 |
| 16 ↓ | 16 ↓ | +1 | 14 |
| 17 ↑ | 17 ↑ | +1 | 15 |
| 18 ↑ | 18 ↑ | +1 | 16 |
| 19 ↓ | 19 ↓ | +1 | 17 |
| 20 ↓ | 20 ↑ | −1 | 17 |
| 21 ↑ | 21 ↑ | −1 | 17 |
| 22 ↑ | 22 ↑ | +1 | 18 |
| 23 ↓ | 23 ↓ | +1 | 19 |
| 24 ↓ | 24 ↓ | +1 | 20 |
| 25 ↓ | 25 ↓ | +1 | 21 |
| 26 ↑ | 26 ↑ | +1 | 22 |
| 27 ↑ | 27 ↓ | −1 | 22 |
| 28 ↓ | 28 ↓ | +1 | 23 |
| 29 ↑ | 29 ↑ | +1 | 24 |
| 30 ↑ | 30 ↑ | +1 | 25 |
| 31 ↑ | 31 ↑ | +1 | 26 |
| 32 ↓ | 32 ↓ | +1 | 27 |
| 33 ↓ | 33 ↓ | +1 | 28 |
| 34 ↓ | 34 ↓ | +1 | 29 |
| 35 ↑ | 35 ↑ | +1 | 30 |
| 36 ↑ | 36 ↑ | +1 | 31 |
| 37 ↓ | 37 ↓ | +1 | 32 |
| 38 ↑ | 38 ↑ | +1 | 33 |
| 39 ↓ | 39 ↓ | +1 | 34 |
| 40 ↓ | 40 ↑ | −1 | 34 |
| 41 ↓ | 41 ↓ | +1 | 35 |

METHOD AND SYSTEM FOR REDUCING FALSE DETECTIONS OF ACCESS SIGNALS

BACKGROUND OF THE INVENTION

In a synchronized wireless communications system, a common method for a remote mobile unit to request access to the system is to send an uplink access message to a fixed base station. An example of this uplink access message is a random access channel (RACH) message found in a time division multiple access (TDMA) type Global System for Mobile Communications (GSM) system. Each time a base station detects a RACH message, physical and logical resources are allocated for the remote mobile unit to communicate. The physical and logical resources in a typical system are limited, resulting in degradation of system performance and preventing other potential mobile units from accessing the system whenever a RACH message is falsely detected. The development of reliable procedures to minimize false RACH message has a very high priority in the system. These procedures should be designed to have a negligible adverse impact on the detection sensitivity of actual RACH messages.

In a conventional GSM system, there are built in protections to maximize signal detection that do not address the problem of false detection. For example, information bits in a RACH message are encoded with cyclical redundancy code (CRC) parity check bits that allow for noise corrupted RACH messages to be detected and discarded by the base station. However, this CRC parity check may still allow false RACH messages to be detected. Since the base station is detecting the presence of RACH messages many times a second, other criteria that characterizes the quality of the received signal need to be developed to avoid overwhelming the resources of the base station with false RACH message detections. Therefore, it is desirable to provide a technique that reduces or avoids the detection of false access messages in order prevent unnecessary allocation of system resources.

SUMMARY OF THE INVENTION

From the foregoing, it may be appreciated by those skilled in the art that a need has arisen for the ability to eliminate the detection of false access messages and their impact on system resource allocation. In accordance with the present invention, a method and system for reducing false detections of access signals are provided that substantially eliminate or greatly reduce disadvantages and problems of conventional access signal detection.

According to an embodiment of the present invention, there is provided a method for reducing false detections of access signals that includes receiving a presumed access signal, demodulating the presumed access signal, and performing equalization on the presumed access signal. A received sequence of bits carried by the presumed access signal is compared to a reference sequence of bits. A number of received sequence of bits matching the reference sequence of bits is identified. A false detection is determined in response to the number falling below a threshold number.

The present invention provides various technical advantages over conventional access signal detection. For example, one technical advantage is to identify whether a presumed access signal is an actual access signal in order to reduce the number of false access detections. Another technical advantage is to compare a received sequence of bits after signal equalization to a reference sequence of bits. Yet another technical advantage is to identify a false access signal in response to a number of matches of the received sequence of bits falling below a desired threshold. Still another technical advantage is to incorporate known signal quality analysis techniques with the present false access detection technique to further eliminate detection of false access messages. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, in which:

FIG. 4 illustrates a technique performed by the system for comparing bit sequences of received access signals.

DETAILED DESCRIPTION OF THE INVENTION

Figure 1:
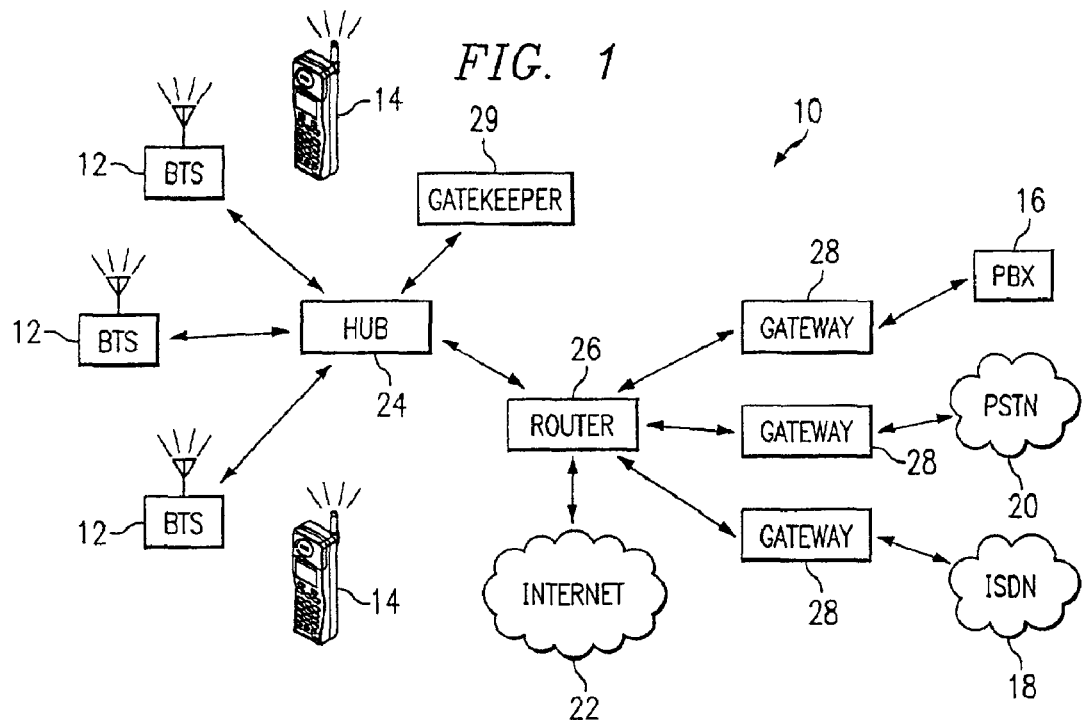
FIG. 1 illustrates a block diagram of a wireless telecommunications network.

FIG. 1 is a block diagram of a wireless telecommunications network 10. Network 10 includes a plurality of base transceiver stations 12 that send and receive wireless communications to a plurality of mobile units 14. Network 10 provides a capability to establish a communication link between mobile units 14 or between a mobile unit 14 and any of a plurality of network facilities, including a private branch exchange 16, an integrated services data network 18, a public switched telephone network 20 and Internet 22. Communication links may also be established between mobile unit 14 and a local or wide area network as desired. A hub 24 interconnects mobile units 14 with the network facilities. A router 26 directs calls among the various network facilities. Gateways 28 provide interconnection interfaces and protocol conversion capability between router 26 and the network facilities. A gatekeeper 29 provides the functions to register mobile units 14, permit access through network 10, translate called numbers, and route calls appropriately.

In one embodiment, base transceiver stations 12 and gatekeeper 30 include the necessary functions to establish communications links for mobile units 14 in a Global System for Mobile Communications (GSM) and H.323 domain environment. In such an environment, a mobile unit 14 desiring a communication link within network 10 sends an uplink access signal to a base transceiver station 12. Base transceiver station 12 looks for and detects this uplink access signal in order to allocate physical and logical resources for the communication link. Because resources are limited within network 10, base transceiver station 12 includes a technique to ensure that signals detected during monitoring operations are actual access signals before needlessly allocating the necessary resources.

Figure 2:
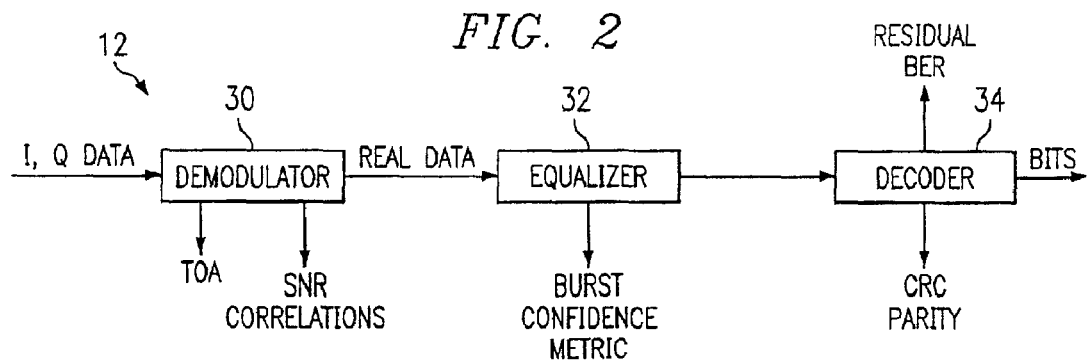
FIG. 2 illustrates a block diagram of a base station in the wireless telecommunications network for reducing false detections of access signals.

FIG. 2 is a block diagram of base station 12 that reduces false detections of access signals. Base station 12 continuously tests for the presence of access signals in order to allocate communication resources for remote mobile unit 14. Base station 12 includes a demodulator 30, an equalizer 32, and a decoder 34. Demodulator 30 determines a time of arrival for an access signal. The time of arrival is the start of an access burst. The time of arrival is estimated by comparing a received sequence of bits to an expected, or reference, sequence of bits. The received sequence of bits are used to establish timing synchronization between a remote mobile unit 14 and base station 12. The time of arrival is expected to occur within the first N bits of synchronization, where N is dependent upon the size of the network of base stations. If a time of arrival is not determined within the first N bits, anything received by demodulator 30 is discarded as a false access signal.

Figure 3:
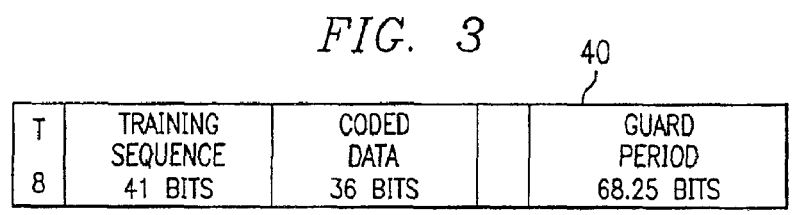
FIG. 3 illustrates an exemplary format of an access signal.

FIG. 3 is an example of an access signal 40. The access signal shown is a typical random access channel message according to the GSM standard. Access signal 40 includes a training sequence of 41 bits, coded data of 36 bits, and a guard period of 68.25 bits. Time of arrival is determined by looking at the first 8 bits of the training sequence. Once a time of arrival has been established, the access signal is passed on to equalizer 32.

Equalizer 32 provides for elimination of the effects of multi-path delay spread and fading that occurs as a result of transmission of the access signal through the air, especially of a trellis coded GMSK modulated burst. In many cases, a severely degraded signal of trellis coded modulation due to multi-path fading can be corrected by equalizer 32. Equalization of burst samples is a computationally intensive procedure and typically only performed on the coded data bits in the access burst. In the present invention, equalization is performed on the training sequence of access signal 40 in order to deliver dramatic gains in false access signal detection.

FIG. 4 shows an example of the training sequence bit comparisons performed on the received access signal. After equalization, each bit of the received training sequence is compared to a corresponding bit of a reference training sequence. For bits that match, a positive value is assigned. For bits that do not match, a negative value is assigned. The positive values are summed to obtain a number, a burst confidence metric, that is compared to a threshold number. For the example shown in FIG. 4, 35 of the 41 bits of the received training sequence matched the reference training sequence. To identify the access signal as an actual access signal, the threshold number would need to be 35 or higher. If the threshold number is 34 or lower, the access signal would be discarded as being a false access signal. The threshold number may be set to any amount according to a desired sensitivity of the access signal detection and the burst confidence metric may be required to exceed the threshold number before an actual access signal is identified.

Decoder 34 performs convolutional decoding of the access signal received from equalizer 32. Decoder 34 may also provide an additional access signal detection capability. Decoder 34 may perform a cyclical redundancy code parity check on the access signal. If the access signal fails the parity check, the access signal is discarded. For an access signal encoded with 6 parity check bits, for example, there is a 1 in 64 probability that a false access signal will pass the parity check. If the access signal passes the parity check, decoder 34 may re-encode the access signal and compare the re-encoded access signal to the received access signal. This comparison provides an estimate of the number of bit errors occurring in the transmission channel. In this manner, advantage can be taken of redundancy bits introduced in the convolutional encoding process. The access signal can be discarded if the number of bit errors exceeds a bit error threshold. For rate ½ convolutional encoding for example, about 1 in 128 false access signals may pass this bit error check.

Suppose that the burst which is being tested for the presence of an access message contains only noise or only uncorrelated interference from an adjacent timeslot or cell. The number of false access signals being passed through to resource allocation dwindles by including the detection techniques discussed above. By using time of arrival where for example 1 in 8 false access signals fails to be detected, cyclical redundancy parity checks where for example 1 in 64 false access signals fails to be detected, and bit error checking where for example 1 in 128 false access signals fails to be detected, the number of false access signals escaping detection falls to 1 in 65536. In the GSM system for example with approximately 115 access signals per signaling channel per second being tested, base transceiver station 12 falsely detects an access signal and initiates resource allocation about once every ten minutes. After equalization and burst confidence metric determination, an average match due to noise and channel interference is about 25.5 of the 41 training sequence samples. If a threshold value of 35 matched samples is selected, only about 1 of 750 false access signals fails to be detected. The threshold value of 35, though providing 6 bits of error headroom, has a negligible impact on access signal detection sensitivity. By also using the burst confidence metric, base transceiver station 12 will falsely detect an access signal about once every 5 days. Thus, the allocation of resources to false access signals is drastically reduced.

Thus, it is apparent that there has been provided, in accordance with the present invention, a method and system for reducing false detections of access signals that satisfy the advantages set forth above. Although the present invention has been described in detail, it should be understood that various changes, substitutions, and alterations may be readily ascertainable by those skilled in the art. For example, though discussed with respect to a GSM system, the present invention may equally apply to CDMA and/or IS-136 systems as well as other similar standards. Other examples may be made herein without departing from the spirit and scope of the present invention as defined by the following claims.

What is claimed is:

1. A method for reducing false detections of access signals, comprising:

receiving a presumed access signal;

demodulating the presumed access signal;

performing equalization on an identification portion of the presumed access signal;

comparing a received sequence of bits carried by the identification portion of the presumed access signal to a reference sequence of bits;

identifying a number of received sequence of bits matching the reference sequence of bits;

determining a false detection in response to the number falling below a threshold number.

2. The method of claim 1, further comprising:

determining an accurate detection in response to the number equaling or exceeding the threshold number.

3. The method of claim 1, wherein the presumed access signal is a random access channel message of a Global System for Mobile Communications system.

4. A method for reducing false detections of access signals, comprising:

receiving a presumed access signal;

demodulating the presumed access signal;

performing equalization on the presumed access signal;

comparing a received sequence of bits carried by the presumed access signal to a reference sequence of bits;

identifying a number of received sequence of bits matching the reference sequence of bits;

determining a false detection in response to the number falling below a threshold number;

wherein the presumed access signal is a random access channel message of a Global System for Mobile Communications system;

wherein the received sequence of bits is a training sequence of the random access channel message.

5. The method of claim 4, wherein the threshold number is 35 bits of the training sequence having 41 bits.

6. A system for reducing false detections of access signals, comprising:

a demodulator operable to receive a presumed access signal, the demodulator operable to determine a time of arrival of the presumed access signal;

an equalizer operable to perform equalization on the presumed access signal, the equalizer operable to compare a received sequence of bits carried by the presumed access signal to a reference sequence of bits, the equalizer operable to determine a number of bits of the received sequence of bits that match the reference sequence of bits, the equalizer operable to identify the presumed access signal as an actual access signal in response to the number of bits equaling or exceeding a threshold number.

7. The system of claim 6, further comprising:

a decoder operable to decode the presumed access signal, the decoder operable to perform a cyclical redundancy code parity check on the received sequence of bits, the decoder operable to identify the presumed access signal as the actual access signal in response to a correct parity determination.

8. The system of claim 6, wherein the presumed access signal is a random access channel message in a Global System for Mobile Communications system.

9. A system for reducing false detections of access signals, comprising:

a demodulator operable to receive a presumed access signal, the demodulator operable to determine a time of arrival of the presumed access signal;

an equalizer operable to perform equalization on the presumed access signal, the equalizer operable to compare a received sequence of bits carried by the presumed access signal to a reference sequence of bits, the equalizer operable to determine a number of bits of the received sequence of bits that match the reference sequence of bits, the equalizer operable to identify the presumed access signal as an actual access signal in response to the number of bits equaling or exceeding a threshold number;

a decoder operable to decode the presumed access signal, the decoder operable to perform a cyclical redundancy code parity check on the received sequence of bits, the decoder operable to identify the presumed access signal as the actual access signal in response to a correct parity determination;

wherein the decoder is operable to re-encode the presumed access signal and compare a re-encoded sequence of bits to the received sequence of bits, the decoder operable to identify the presumed access signal as the actual access signal in response to a number of received sequence of bits matching the re-encoded sequence of bits equaling or exceeding a threshold number.

10. A system for reducing false detections of access signals, comprising:

a demodulator operable to receive a presumed access signal, the demodulator operable to determine a time of arrival of the presumed access signal;

an equalizer operable to perform equalization on the presumed access signal, the equalizer operable to compare a received sequence of bits carried by the presumed access signal to a reference sequence of bits, the equalizer operable to determine a number of bits of the received sequence of bits that match the reference sequence of bits, the equalizer operable to identify the presumed access signal as an actual access signal in response to the number of bits equaling or exceeding a threshold number;

wherein the demodulator is operable to initially identify the presumed access signal as the actual access signal in response to identifying the time of arrival.

11. A system for reducing false detections of access signals, comprising;

a demodulator operable to receive a presumed access signal, the demodulator operable to determine a time of arrival of the presumed access signal;

an equalizer operable to perform equalization on the presumed access signal, the equalizer operable to compare a received sequence of bits carried by the presumed access signal to a reference sequence of bits, the equalizer operable to determine a number of bits of the received sequence of bits that match the reference sequence of bits, the equalizer operable to identify the presumed access signal as an actual access signal in response to the number of bits equaling or exceeding a threshold number;

wherein the demodulator is operable to identify the time of arrival of the presumed access signal within a first eight bits of the presumed access signal.

12. A system for reducing false detections of access signals, comprising:

a demodulator operable to receive a presumed access signal, the demodulator operable to determine a time of arrival of the presumed access signal;

an equalizer operable to perform equalization on the presumed access signal, the equalizer operable to compare a received sequence of bits carried by the presumed access signal to a reference sequence of bits, the equalizer operable to determine a number of bits of the received sequence of bits that match the reference sequence of bits, the equalizer operable to identify the presumed access signal as an actual access signal in response to the number of bits equaling or exceeding a threshold number;

wherein the presumed access signal is a random access channel message in a Global System for Mobile Communications system;

wherein the received sequence of bits is a training sequence of the random access channel message.

13. The system of claim 12, wherein the training sequence is 41 bits, the 41 bits of the training sequence being compared to a reference 41 bit training sequence.

14. The system of claim 13, wherein the threshold number is 35 of the 41 bits of the received sequence of bits matching the reference sequence of bits.

15. A system for reducing false detections of access signals, comprising:

a demodulator operable to receive a presumed access signal, the demodulator operable to determine a time of arrival of the presumed access signal;

an equalizer operable to perform equalization on the presumed access signal, the equalizer operable to compare a received sequence of bits carried by the presumed access signal to a reference sequence of bits, the equalizer operable to determine a number of bits of the received sequence of bits that match the reference sequence of bits, the equalizer operable to identify the presumed access signal as an actual access signal in response to the number of bits equaling or exceeding a threshold number;

wherein each bit of the received sequence of bits is compared to each bit of the reference sequence of bits, the equalizer operable to generate a positive value for each bit of the received sequence of bits matching a corresponding bit of the reference sequence of bits, the equalizer operable to sum the positive values generated in order to obtain the number for comparison with the threshold number.

16. A method of reducing false detection of access signals, comprising:

receiving a presumed access signal;

demodulating the presumed access signal;

determining a time of arrival of the presumed access signal;

discarding the presumed access signal in response to no time of arrival determination;

equalizing the presumed access signal in response to determining the time of arrival;

comparing each bit of a received sequence of bits of the presumed access signal to a corresponding bit of a reference sequence of bits;

generating a positive value for each bit of the received sequence of bits matching its corresponding bit of the reference sequence of bits;

accumulating the positive values to obtain a number;

comparing the number to a threshold number;

identifying the presumed access signal as an actual access signal in response to the number equaling or exceeding the threshold number.

17. The method of claim 16, wherein the time of arrival is determined by establishing synchronization between a mobile unit and a base station.

18. The method of claim 16, further comprising:

performing a cyclical redundancy code parity check on the presumed access signal;

discarding the presumed access signal in response to identifying a failure in the parity check.

19. The method of claim 18, further comprising:

re-encoding the presumed access signal in response to identifying a successful parity check;

comparing the re-encoded presumed access signal to the received presumed access signal;

identifying a number of residual bit errors due to channel noise in response to the comparison;

discarding the presumed access signal in response to the number of bit errors exceeding a bit error threshold.

20. The method of claim 16, further comprising:

allocating physical and logical resources associated with the actual access signal.

21. A system for reducing false detections of access signals, comprising:

means for receiving a presumed access signal;

means for demodulating the presumed access signal;

means for performing equalization on an identification portion of the presumed access signal;

means for comparing a received sequence of bits carried by the identification portion of the presumed access signal to a reference sequence of bits;

means for identifying a number of received sequence of bits matching the reference sequence of bits;

means for allocating physical and logical resources associated with the presumed access signal in response to the number equaling or exceeding a threshold number.

22. The system of claim 21, further comprising:

means for performing a cyclical redundancy code parity check on the presumed access signal;

means for discarding the presumed access signal without resource allocation in response to identifying a failure in the parity check.

23. The system of claim 21, wherein the presumed access signal is a random access channel message according to a Global System for Mobile Communications protocol.

24. A system for reducing false detections of access signals, comprising:

means for receiving a presumed access signal;

means for demodulating the presumed access signal;

means for performing equalization on the presumed access signal;

means for comparing a received sequence of bits carried by the presumed access signal to a reference sequence of bits;

means for identifying a number of received sequence of bits matching the reference sequence of bits;

means for allocating physical and logical resources associated with the presumed access signal in response to the number equaling or exceeding a threshold number;

means for determining a time of arrival of the presumed access signal;

means for discarding the presumed access signal in response to not determining the time of arrival.

25. A system for reducing false detections of access signals, comprising:

means for receiving a presumed access signal;

means for demodulating the presumed access signal;

means for performing equalization on the presumed access signal;

means for comparing a received sequence of bits carried by the presumed access signal to a reference sequence of bits;

means for identifying a number of received sequence of bits matching the reference sequence of bits;

means for allocating physical and logical resources associated with the presumed access signal in response to the number equaling or exceeding a threshold number;

means for performing a cyclical redundancy code parity check on the presumed access signal;

means for discarding the presumed access signal without resource allocation in response to identifying a failure in the parity check;

means for re-encoding the presumed access signal in response to identifying a successful parity check;

means for comparing the re-encoded presumed access signal to the received access signal;

means for identifying a number of residual bit errors between the re-encoded presumed access signal and the received presumed access signal;

means for discarding the presumed access signal in response to the number of residual bit errors exceeding a bit error threshold.

26. Logic encoded in media for reducing false detections of access signals, the logic operable to:

receive a presumed access signal;

demodulate the presumed access signal;

perform equalization on an identification portion of the presumed access signal;

compare a received sequence of bits carried by the identification portion of the presumed access signal to a reference sequence of bits;

identify a number of received sequence of bits matching the reference sequence of bits;

allocate physical and logical resources associated with the presumed access signal in response to the number equaling or exceeding a threshold number.

* * * * *